(12) United States Patent
Meier et al.

(10) Patent No.: US 12,194,557 B2
(45) Date of Patent: Jan. 14, 2025

(54) FIXTURE THAT HOLDS A SPECIMEN DURING ELECTRICAL DISCHARGE MACHINING OF THE SPECIMEN

(71) Applicant: The Boeing Company, Chicago, IL (US)

(72) Inventors: Stefanie Anita Meier, Seattle, WA (US); Don Browder, Tonasket, WA (US)

(73) Assignee: The Boeing Company, Chicago, IL (US)

( * ) Notice: Subject to any disclaimer, the term of this patent is extended or adjusted under 35 U.S.C. 154(b) by 1324 days.

(21) Appl. No.: 16/517,068

(22) Filed: Jul. 19, 2019

(65) Prior Publication Data

US 2021/0016377 A1     Jan. 21, 2021

(51) Int. Cl.
    *B23H 11/00*       (2006.01)
    *B23H 7/02*        (2006.01)
    *B23H 7/20*        (2006.01)
    *B23Q 3/06*       (2006.01)

(52) U.S. Cl.
CPC ..................................... *B23H 7/20* (2013.01)

(58) Field of Classification Search
CPC . B23H 7/20; B23H 11/00; B23H 7/02; G01N 3/04
See application file for complete search history.

(56) References Cited

U.S. PATENT DOCUMENTS

| | | | | |
|---|---|---|---|---|
| 2,176,089 A | * | 10/1939 | Malone | B23Q 3/08 269/287 |
| 4,698,475 A | * | 10/1987 | Lothenbach | B23Q 7/1494 204/297.08 |
| 4,757,178 A | * | 7/1988 | Iwasaki | B23H 11/003 219/69.1 |
| 5,095,635 A | * | 3/1992 | Iwasaki | B23H 11/003 33/645 |
| 5,310,468 A | * | 5/1994 | Bruns | B23H 11/003 204/297.05 |
| 5,988,955 A | * | 11/1999 | Curtis | B23B 51/10 408/79 |
| 6,355,906 B1 | * | 3/2002 | Okuno | B23K 26/0838 219/121.64 |
| 8,726,740 B1 | * | 5/2014 | Mekid | G01L 5/167 73/862.041 |

(Continued)

FOREIGN PATENT DOCUMENTS

| | | | | |
|---|---|---|---|---|
| CN | 102412522 | * | 1/2014 | .............. F16B 21/02 |
| CN | 104668684 A | * | 6/2015 | |

(Continued)

*Primary Examiner* — Steven W Crabb
*Assistant Examiner* — Lawrence H Samuels
(74) *Attorney, Agent, or Firm* — Yee & Associates, P.C.

(57) ABSTRACT

A fixture holds a specimen during electrical discharge machining of the specimen and prevents tensile test samples cut from the specimen from bending or curving during the electrical discharge machining. The fixture has first engagement surfaces that clamp to one end of the specimen and has second engagement surfaces that clamp to the opposite end of the specimen during electrical discharge machining of the specimen. The fixture clamping to opposite ends of the specimen prevents the tensile test samples cut from the specimen from bending during electrical discharge machining of the specimen.

20 Claims, 10 Drawing Sheets

(56) References Cited

U.S. PATENT DOCUMENTS

| | | | | |
|---|---|---|---|---|
| 8,975,553 | B2 * | 3/2015 | Saigusa | B23H 11/003 219/69.11 |
| D738,325 | S * | 9/2015 | Bulla | D13/173 |
| 9,541,914 | B2 * | 1/2017 | Nishikawa | G05B 19/182 |
| 2002/0168237 | A1 * | 11/2002 | Cline | B23B 47/28 408/1 R |
| 2002/0185472 | A1 * | 12/2002 | Nordquist | B23Q 16/08 219/69.15 |
| 2003/0213776 | A1 * | 11/2003 | Walter | B23H 11/003 219/69.11 |
| 2007/0210500 | A1 * | 9/2007 | Troxler | B23Q 3/103 269/71 |
| 2010/0258215 | A1 * | 10/2010 | Garnett | B27C 5/10 403/8 |
| 2012/0272944 | A1 * | 11/2012 | Coustier | B28D 5/045 125/35 |
| 2013/0043217 | A1 * | 2/2013 | Yuzawa | B23H 9/00 219/69.12 |
| 2013/0075630 | A1 * | 3/2013 | Malmin | B23H 1/00 219/121.72 |
| 2013/0277347 | A1 * | 10/2013 | Yamaguchi | B23H 11/003 219/158 |
| 2015/0144599 | A1 * | 5/2015 | Kouda | F16C 19/52 219/69.12 |
| 2015/0158150 | A1 * | 6/2015 | Taylor | B23Q 3/06 409/225 |
| 2018/0250760 | A1 * | 9/2018 | Flore | F04C 2/10 |
| 2019/0118318 | A1 * | 4/2019 | Tai | G01M 7/022 |

FOREIGN PATENT DOCUMENTS

| | | | | |
|---|---|---|---|---|
| JP | 2980587 | * | 11/1999 | F16B 21/02 |
| JP | 2002292526 A | * | 10/2002 | |

* cited by examiner

FIXTURE THAT HOLDS A SPECIMEN DURING ELECTRICAL DISCHARGE MACHINING OF THE SPECIMEN

FIELD

This disclosure pertains to a fixture that holds a specimen during electrical discharge machining of the specimen. More specifically, this disclosure pertains to a fixture having first engagement surfaces that clamp to one end of a specimen and having second engagement surfaces that clamp to the opposite end of the specimen during electrical discharge machining of the specimen. The fixture clamping to opposite ends of the specimen prevents the specimen from bending during electrical discharge machining of the specimen.

BACKGROUND

Extremely thin specimens or micro-thin specimens are used in the analysis of additively manufactured parts. A micro-thin specimen is constructed of the same material as the additively manufactured part, for example a metal. A micro-thin specimen could be as thin as under 0.030", and have an overall length of under 0.065", with tolerances as small as +/−0.0005".

Machining micro-thin specimens to a high level of accuracy requires the use of electrical discharge machining (EDM) to maintain dimensional accuracy and keep residual stresses low. In the electrical discharge machining of a micro-thin specimen, a standard EDM fixture holds the specimen at only one end with the opposite end of the specimen being cantilevered and free to move. This often results in the material of the specimen bending during EDM machining. During EDM machining of the specimen, a heat affected zone of the material of the specimen is produced on the outer surface of the specimen where the EDM machining is taking place. The heat affected zone of the specimen cools at a different rate than the interior of the specimen during the cooling of the specimen after the EDM machining. This often results in the specimen bending when cooling.

SUMMARY

The fixture of this disclosure holds a specimen during electrical discharge machining of the specimen and prevents the specimen from bending. In one example, a fixture that holds a specimen for machining of the specimen is described. The fixture includes a first block and a second block that are removably attachable together by a plurality of fasteners. Within examples, the specimen to be machined is positioned between the first block and the second block and the fasteners are tightened down, clamping the specimen between the first block and the second block.

The first block has a hole extending through the first block. The hole is positioned between and separates a first engagement surface on the first block and a second engagement surface on the first block.

A first groove extends across the first block and across the hole through the first block. A first part of the first groove is positioned on one side of the hole through the first block and a second part of the first groove is positioned on an opposite side of the hole through the first block. The first groove is positioned on the first block between and separating the first engagement surface on the first block and the second engagement surface on the first block.

The second block also has a hole extending through the second block. The hole on the second block is positioned between and separates a first engagement surface on the second block and a second engagement surface on the second block.

A second groove extends across the second block and across the hole through the second block. A first part of the second groove is positioned on one side of the hole through the second block and a second part of the second groove is positioned on an opposite side of the hole through the second block. The second groove is positioned on the second block between and separating the first engagement surface on the second block and the second engagement surface on the second block.

Within examples, a shaft extends from the first block. The shaft is configured for attachment to an electrical discharge machining device for electrical discharge machining of the specimen held by the first block and the second block of the fixture.

Within examples, a plurality of dowel pins project from one of the first block and the second block. A plurality of dowel pin holes extend into the other of the first block and the second block. The plurality of dowel pins engage in the plurality of dowel pin holes when removably attaching the first block and the second block to securely align and hold the first block and the second block relative to each other.

Within examples, in use of the fixture in electrical discharge machining of a specimen, the specimen is first positioned between the first block and the second block before the first block and the second block are releasably attached together. As the first block and the second block are releasably attached together by a plurality of fasteners, one end of the specimen is clamped between the first engagement surface on the first block and the first engagement surface on the second block, and the opposite end of the specimen is clamped between the second engagement surface on the first block and the second engagement surface on the second block. With the specimen clamped between the first block and the second block, the specimen is accessible for machining through the first groove extending across the first block and the second groove extending across the second block. The specimen is also accessible for machining through the hole through the first block and the hole through the second block.

In the above manner, the fixture holds opposite ends of the specimen during an electrical discharge machining performed on the specimen and prevents the test samples cut from the specimen from bending or curving during the electrical discharge machining.

In an example, a fixture that holds a specimen when machining the specimen is described. The fixture comprises a first block and a hole through the first block, the hole being positioned between and separating a first engagement surface on the first block and a second engagement surface on the first block. The system also comprises a second block and a hole through the second block, the hole positioned between and separating a first engagement surface on the second block and a second engagement surface on the second block. The system also comprises a shaft extending from the first block. The first block and the second block is attachable together to clamp a specimen between the first engagement surface on the first block and the first engagement surface on the second block and between the second engagement surface on the first block and the second engagement surface on the second block with the specimen being accessible for machining through the hole through the first block and through the hole through the second block. The shaft is configured for attachment to a device that is operable to machine the specimen clamped between the first engagement surface on the first block and the first engagement surface on the second block and between the second engagement surface on the first block and the second engagement surface on the second block.

Within examples, the device that is operable to machine the specimen is an electrical discharge machine.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the fixture of this disclosure and its method of use are set forth in the following detailed description and in the drawing figures.

DETAILED DESCRIPTION

Figure 1:
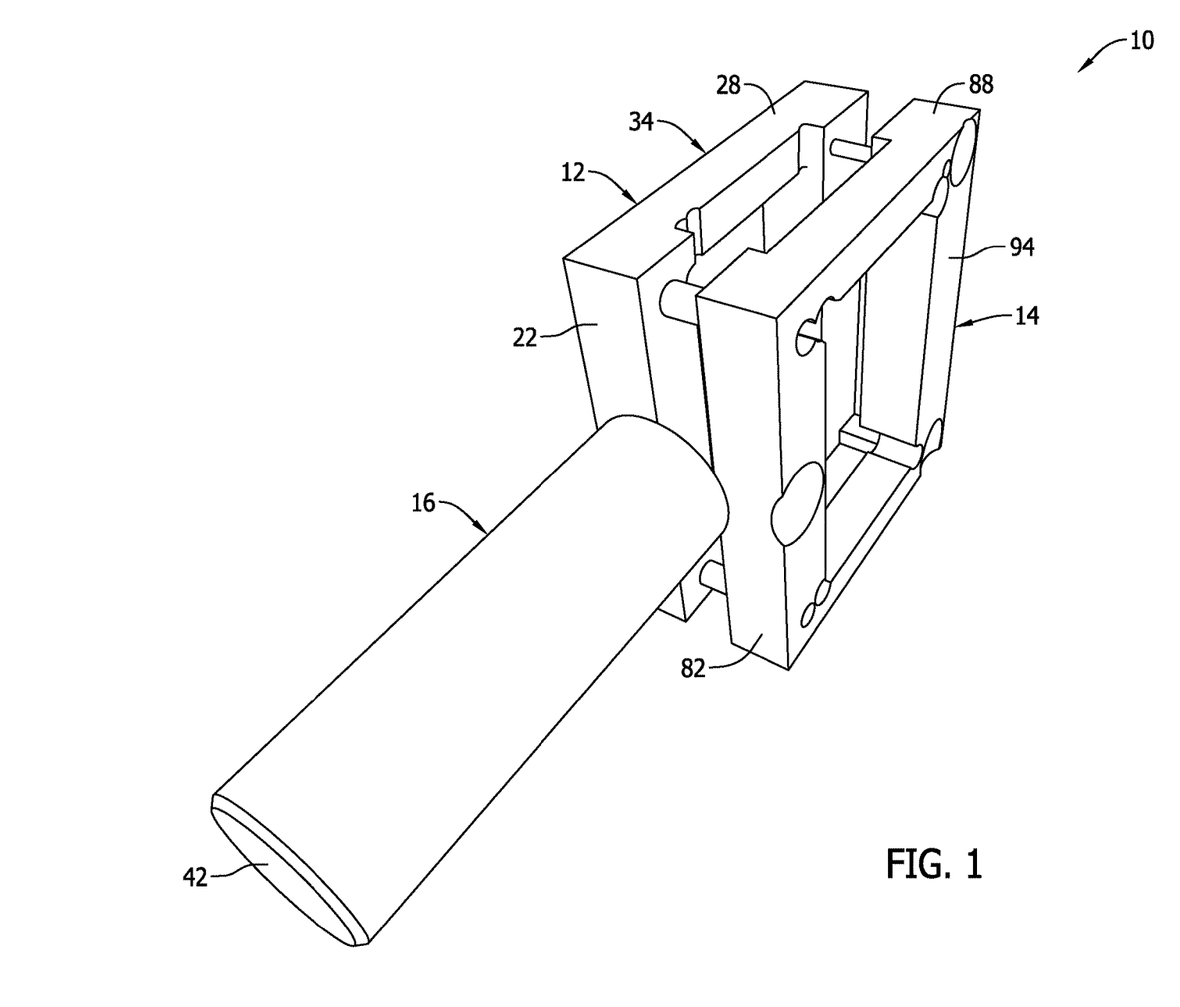
FIG. 1 is a representation of a top, perspective view of a shaft end of a fixture, according to an example embodiment of this disclosure.
Figure 2:
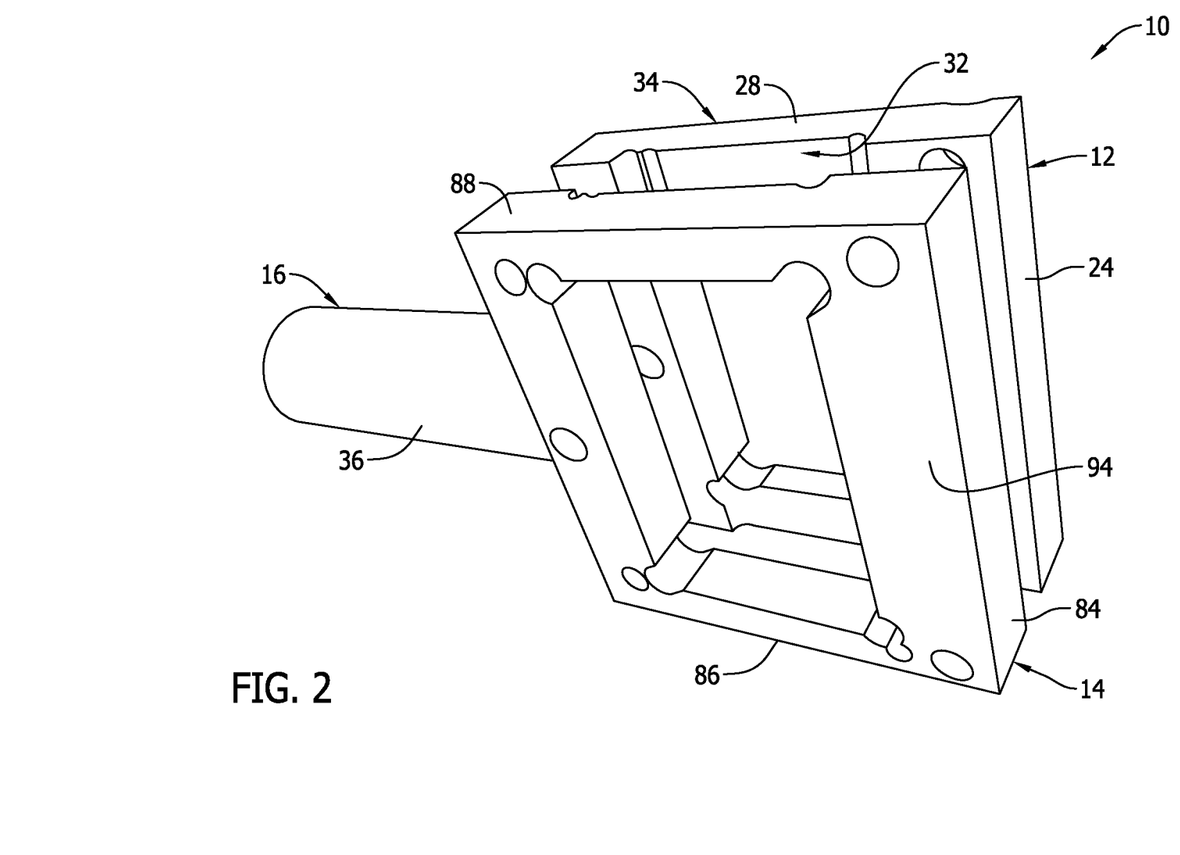
FIG. 2 is a representation of a top perspective view of the end of the fixture opposite the shaft end, according to an example embodiment.
Figure 5:
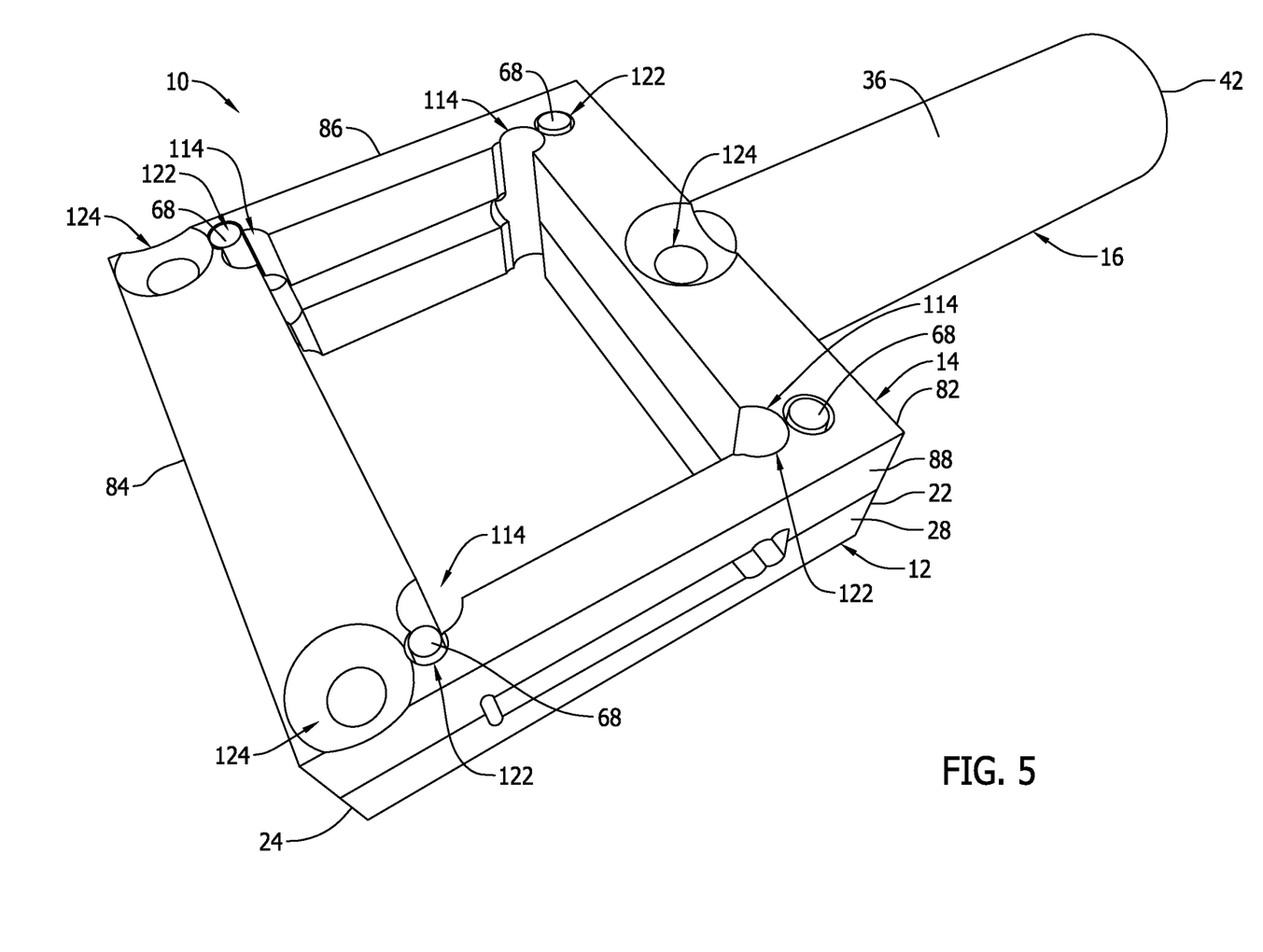
FIG. 5 is a representation of a perspective view of the first block and second block of the fixture clamped together, according to an example embodiment.
Figure 6:
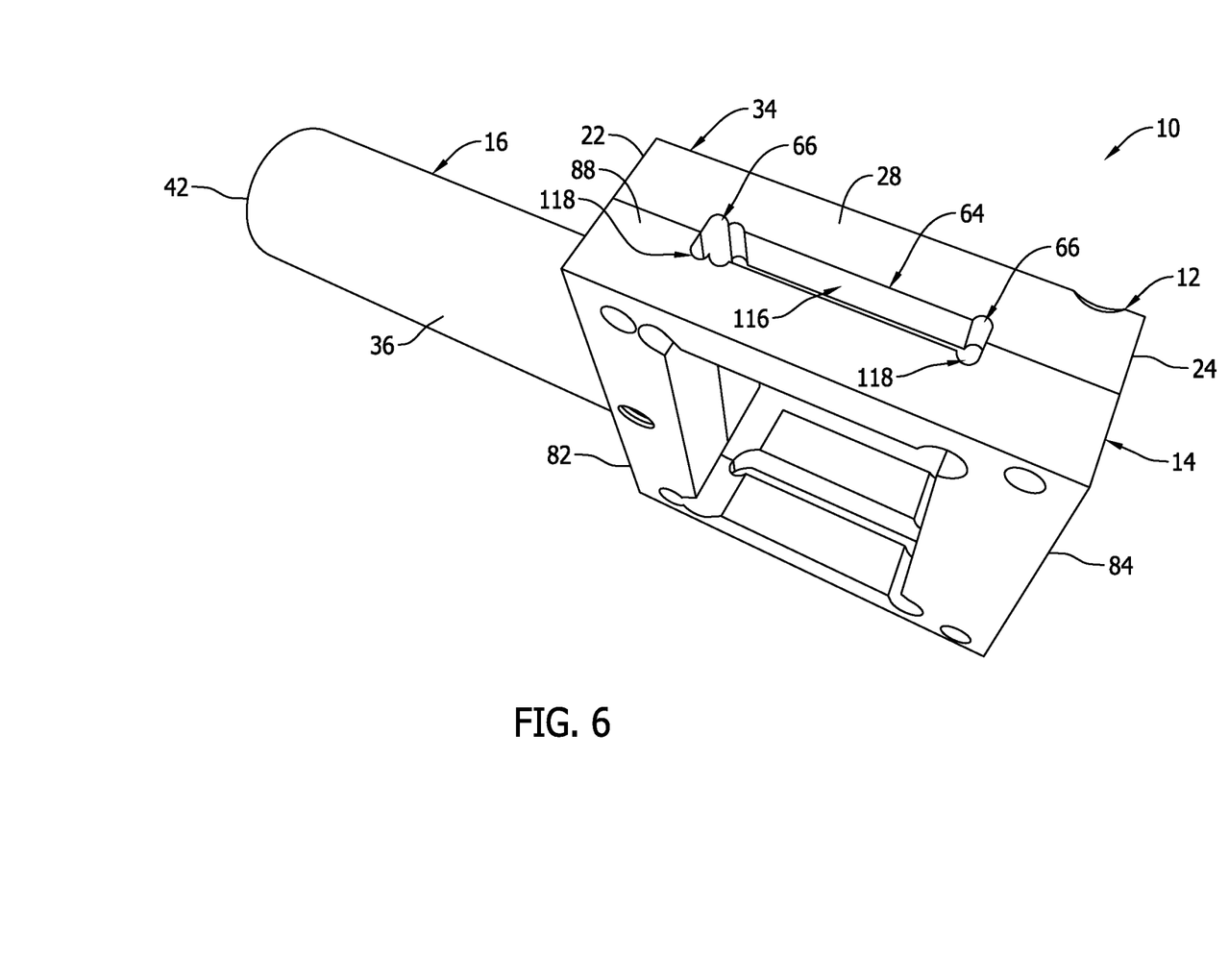
FIG. 6 is a representation of an additional perspective view of the first block and second block of the fixture clamped together, according to an example embodiment.

FIGS. 1, 2 and 5 of the drawing figures represent a fixture 10 according to an example embodiment of this disclosure. The fixture 10 is designed to hold a specimen during electrical discharge machining of the specimen and prevent bending of the specimen during the machining. The fixture 10 comprises a first block 12, a second block 14, and a shaft 16 projecting from the first block 12. The first block 12, the second block 14 and the shaft 16 are constructed of a material sufficiently strong to securely hold a specimen during electrical discharge machining of the specimen, for example, a metal or other equivalent material.

Figure 3:
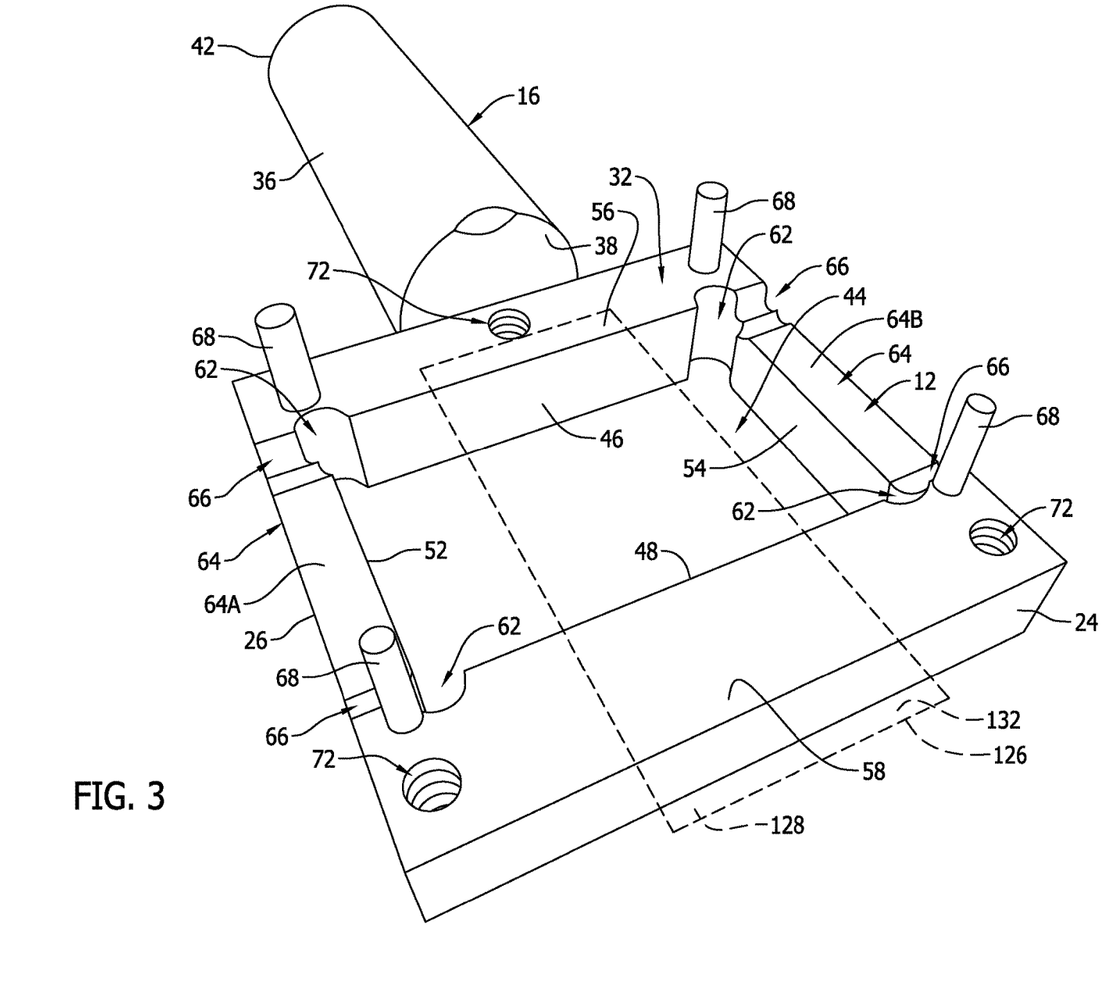
FIG. 3 is a representation of a top perspective view of the first block of the fixture, according to an example embodiment.

The first block 12 is represented in FIG. 3. The first block 12 has a general cubic configuration. As represented in FIG. 3, the configuration of the first block 12 is defined by a proximal exterior side wall 22 and an opposite distal exterior side wall 24, a left side exterior side wall 26 and an opposite right side exterior side wall 28. The cubic configuration of the first block 12 is also defined by an interior surface 32 of the first block 12 and an opposite exterior surface 34 of the first block 12.

The shaft 16 is integrally attached to the proximal exterior side wall 22 of the first block 12 and is one piece with the first block 12. The shaft 16 has a cylindrical exterior surface 36 that extends from a proximal end surface 38 of the shaft to a distal end surface 42 of the shaft. As represented in FIG. 3, about half of the shaft proximal end surface 38 is formed integrally with the proximal exterior side wall 22 of the first block 12. In other examples, a different amount of the shaft proximal end surface is formed integrally with the proximal exterior side wall 22 of the first block 12. The shaft exterior surface 36 is configured for attachment to a chuck or other attachment mechanism of an electrical discharge machine.

The first block 12 has a hole 44 extending through the first block. The hole 44 is for a profile cut of the specimen. As represented in FIG. 3, the hole 44 has a general, rectangular configuration defined by a proximal interior side wall 46 and an opposite distal interior side wall 48, a left side interior side wall 52 and an opposite right side interior side wall 54. The hole 44 is positioned between and separates a first engagement surface 56 on the interior surface 32 of the first block 12 and a second engagement surface 58 on the interior surface 32 of the first block 12. The first engagement surface 56 and the second engagement surface 58 are flat and coplanar.

There are four hole notches 62 that pass through the first block 12 and intersect the hole 44 through the first block 12 at the four corners of the hole 44 through the first block 12. As represented in FIG. 3, the four hole notches 62 have generally semi-circular cross-section configurations and are positioned at the opposite ends of the proximal interior side wall 46 where the proximal interior side wall 46 intersects with the left side interior side wall 52 and the right side interior side wall 54, and are positioned at the opposite ends of the distal interior side wall 48 where the distal interior side wall 48 intersects with the left side interior side wall 52 and the right side interior side wall 54. The four hole notches 62 are dimensioned to receive a wire of an electrical discharge machine through the notches.

A first groove 64 is recessed into the interior surface 32 of the first block 12. The first groove 64 is for a face cut of the specimen. The first groove 64 extends across the interior surface 32 of the first block 12 and across the hole 44 through the first block 12. As represented in FIG. 3, a first part 64A of the first groove 64 is positioned on one side of the hole 44 through the first block 12 and a second part 64B of the groove 64 is positioned on an opposite side of the hole 44 through the first block 12. The first groove 64 has a length dimension that is substantially equal to a width dimension of the hole 44 through the first block 12. The first groove 64 is positioned on the first block 12 between and separating the first engagement surface 56 on the first block 12 and the second engagement surface 58 on the first block 12.

Four grooves notches 66 pass through the left side exterior side wall 26 and the left side interior side wall 52 of the first block 12, and through the right side exterior side wall 28 and the right side interior side wall 58 of the first block 12. Pairs of the four groove notches 66 are positioned at opposite sides of the first groove 64 and intersect with and are perpendicular to the four hole notches 62. The four groove notches 66 have general semi-circular cross-section configurations and are dimensioned to receive a wire of an electrical discharge machine through the four groove notches 66.

Four dowel pins 68 project outwardly from the first engagement surface 56 and the second engagement surface 58 of the first block 12. The four dowel pins 68 are parallel to each other and perpendicular to the first engagement surface 56 and the second engagement surface 58 of the first block 12.

Three internally threaded fastener holes 72 extend into the first engagement surface 56 and the second engagement surface 58 of the first block 12. As represented in FIG. 3, one of the internally screw threaded holes 72 extends into the first engagement surface 56 and two of the internally screw threaded holes 72 extend into the second engagement surface 58.

Figure 4:
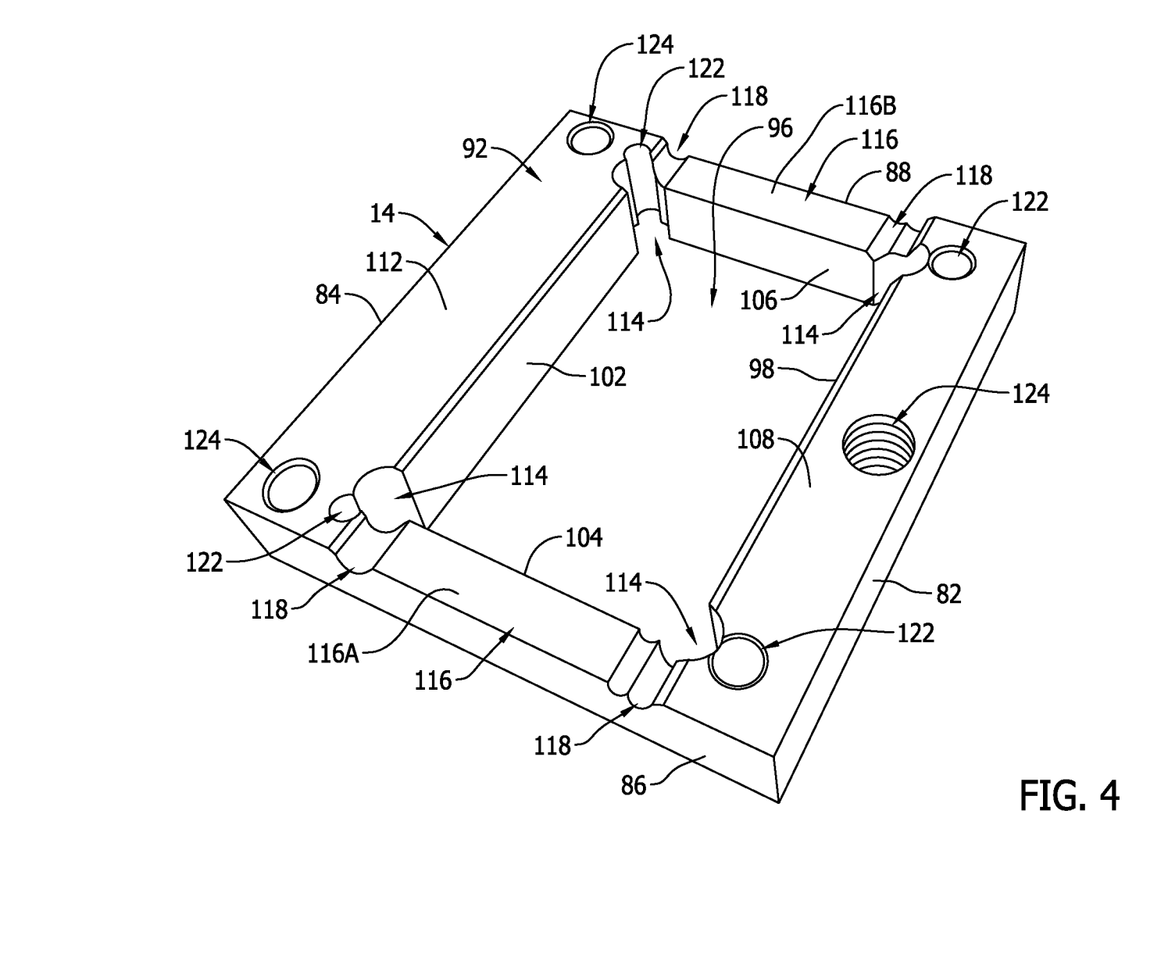
FIG. 4 is a representation of a top perspective view of the second block of the fixture, according to an example embodiment.

The second block 14 of the fixture 10 is represented in FIG. 4. The second block 14 has a construction that is substantially the same as that of the first block 12, and that is substantially a match of the construction of the first block 12. For instance, in an example, the hole through the first block, the first engagement surface on the first block and the second engagement surface on the first block substantially match the hole through the second block, the first engagement surface on the second block and the second engagement surface on the second block. This matching allows the hole through the first block, the first engagement surface on the first block and the second engagement surface on the first block to align with, respectively, the hole through the second block, the first engagement surface on the second block and the second engagement surface on the second block, when the first and second blocks are attached.

The second block 14 also has a cubic configuration defined by a proximal exterior side wall 82 and an opposite distal exterior side wall 84, and a left side exterior side wall 86 and an opposite right side exterior side wall 88. The cubic configuration of the second block 14 is also defined by an interior surface 92 of the second block 14 and an opposite exterior surface 94 of the second block 14. The interior surface 32 of the first block 12 opposes the interior surface 92 of the second block 14 in use of the fixture 10.

A hole 96 extends through the second block 14. The hole 96 is for a profile cut of the specimen. The hole 96 through the second block 14 has substantially the same configuration as the hole 44 through the first block 12. As represented in FIG. 4, the hole 96 through the second block 14 has a general rectangular configuration defined by a proximal interior side wall 98 and an opposite distal interior side wall 102, a left side interior side wall 104 and an opposite right side interior side wall 106. The hole 96 through the second block 14 is positioned between and separates a first engagement surface 108 on the interior surface 92 of the second block 14 and a second engagement surface 112 on the interior surface 92 of the second block 14. The first engagement surface 108 and the second engagement surface 112 are flat and coplanar surfaces.

Four hole notches 114 pass through the second block 14 at the four corners of the hole 96 through the second block 14. The four hole notches 114 are positioned at opposite ends of the proximal interior side wall 98 where the proximal interior side wall 98 intersects with the left side interior side wall 104 and the right side interior side wall 106, and the opposite ends of the distal interior side wall 102 where the distal interior side wall 102 intersects with the left side interior side wall 104 and the right side interior side wall 106. Each of the four hole notches 114 has a general semi-circular cross-section configuration and is dimensioned to receive a wire of an electrical discharge machine through the notch. The four hole notches 62 and the four hole notches 114 allow for threading a wire of an electrical discharge machine through fixture 10 when the specimen clamped to the fixture 10 covers or substantially covers hole 44 and hole 96.

A second groove 116 is recessed into the interior surface 92 of the second block 14. The second groove 116 is for a face cut of the specimen. The second groove 116 extends across the interior surface 92 of the second block 14 and across the hole 96 through the second block 14. As represented in FIG. 4, a first part 116A of the second groove 116 is positioned on one side of the hole 96 through the second block 14 and a second part 116B of the groove 116 is positioned on an opposite side of the hole 96 through the second block 14. The second groove 116 has a length dimension that is substantially equal to a width dimension of the hole 96 through the second block 14. The second groove 116 is positioned on the interior surface 92 of the second block 14 between and separating the first engagement surface 108 of the second block 14 and the second engagement surface 112 of the second block 14.

Four groove notches 118 pass through the left side exterior side wall 86 and the left side interior side wall 104 of the second block 14, and through the right side exterior side wall 88 and the right side exterior side wall 106 of the second block 14. Pairs of the four groove notches 118 are positioned on opposite sides of the second groove 116 on the second block 14. The four groove notches 118 have semi-circular cross-section configurations and are dimensioned to receive a wire of an electrical discharge machine through the groove notches 118. Each of the groove notches 118 also intersects one of the four hole notches 114 through the second block 14 and is oriented perpendicular to the hole notch.

Four dowel pin holes 122 extend into the interior surface 92 of the second block 14. Two of the dowel pin holes 122 extend into the first engagement surface 108 of the second block 14 and two of the dowel pin holes 122 extend into the second engagement surface 112 of the second block 14. Each of the dowel pin holes 122 has a cross-section dimension that enables one of the dowel pins 68 on the first block 12 to be inserted into each of the dowel pin holes 122 in the second block 14. The dowel pin holes 122 are also positioned on the interior surface 92 of the second block 14 to correspond with the positions of the four dowel pins 68 that project from the interior surface 32 of the first block 12.

There are also three internally screw threaded holes 124 in the interior surface 92 of the second block 14. The internally screw threaded holes 124 are positioned on the interior surface 92 of the second block 14 to correspond with the positions of the internally screw threaded holes 72 on the interior surface 32 of the first block 12. The internally screw threaded holes 124 on the second block 14 are dimensioned to receive the same screw threaded fasteners as the internally screw threaded holes 72 on the first block 12.

In use of the fixture 10 in electrical discharge machining of a specimen, the specimen 126 (represented by dashed lines in FIG. 3 and solid lines in FIGS. 7-9) is first positioned between the interior surface 32 of the first block 12 and the interior surface 92 of the second block 14. The specimen 126 is positioned between the first block 12 and the second block 14 before the first block 12 and the second block 14 are releasably attached together. As the first block 12 and the second block 14 are releasably attached together by fasteners such as screw threaded fasteners that are screw threaded through the internally screw threaded holes 124 of the second block 14 and into the internally screw threaded holes 72 of the first block 12, one end of the specimen 126 is clamped between the first engagement surface 56 on the first block 12 and the first engagement surface 108 on the second block 14. The opposite end of the specimen 126 is clamped between the second engagement surface 58 on the first block 12 and the second engagement surface 112 on the second block 14. With the specimen 126 clamped between the first block 12 and the second block 14, the specimen 126 is accessible for machining through the first groove 64 extending across the first block 12 and the second groove 116 extending across the second block 14. The specimen 126 is also accessible for machining through the hole 44 through the first block 12 and the hole 96 through the second block 14.

With the specimen 126 held between the first block 12 and the second block 14 of the fixture 10, and with the fixture 10 attached by the shaft 16 to an electrical discharge machine 128 (represented schematically in FIGS. 7 and 8), the wire 132 (represented schematically in FIGS. 7 and 8) of the electrical discharge machine is passed through the first groove 64 of the first block 12. More specifically, the wire 132 of the electrical discharge machine 128 is passed through a pair of aligned groove notches 66 at one side of the first groove 64. The electrical discharge machine 128 is then operated to cause the wire 132 to move across a first face surface 134 of the specimen 126 and across the first groove 64 making a rough cut of the first face surface 134 of the specimen opposing the first groove 64 in the first block 12. In an example, an opposite face surface of the specimen is then machined. For instance, the wire 132 of the electrical discharge machine 128 is then cut, removed from the first groove 64 and is passed through a pair of aligned groove notches 118 of the second groove 116 of the second block 14. The electrical discharge machine 128 is then operated to move the wire 132 across the second groove 116 and across a second face surface 136 of the specimen 126 that opposes the second groove 116 to make a rough cut of the second face surface 136 of the specimen 126.

Figure 7:
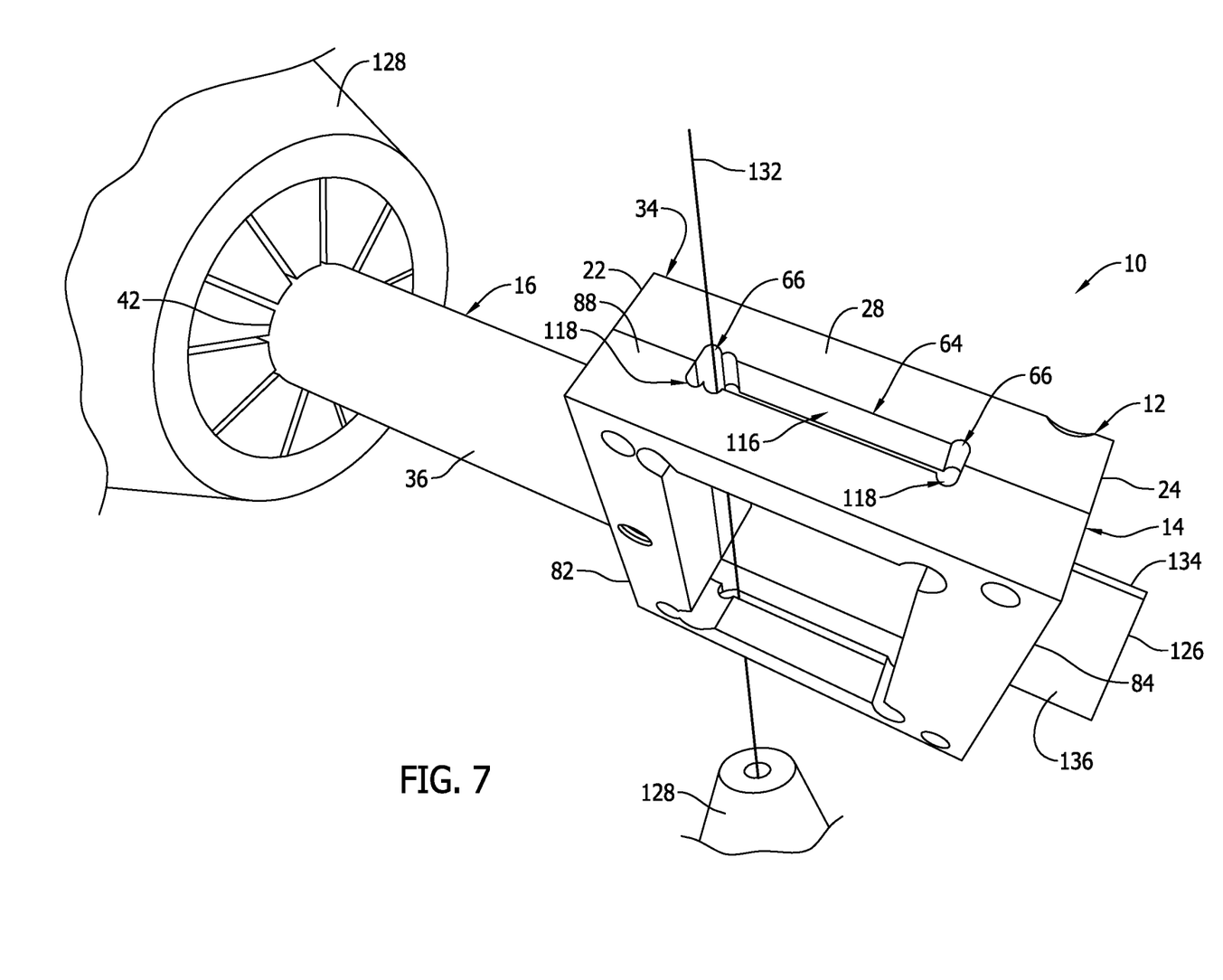
FIG. 7 is a representation of the fixture clamped on an EDM machine, according to an example embodiment.
Figure 8:
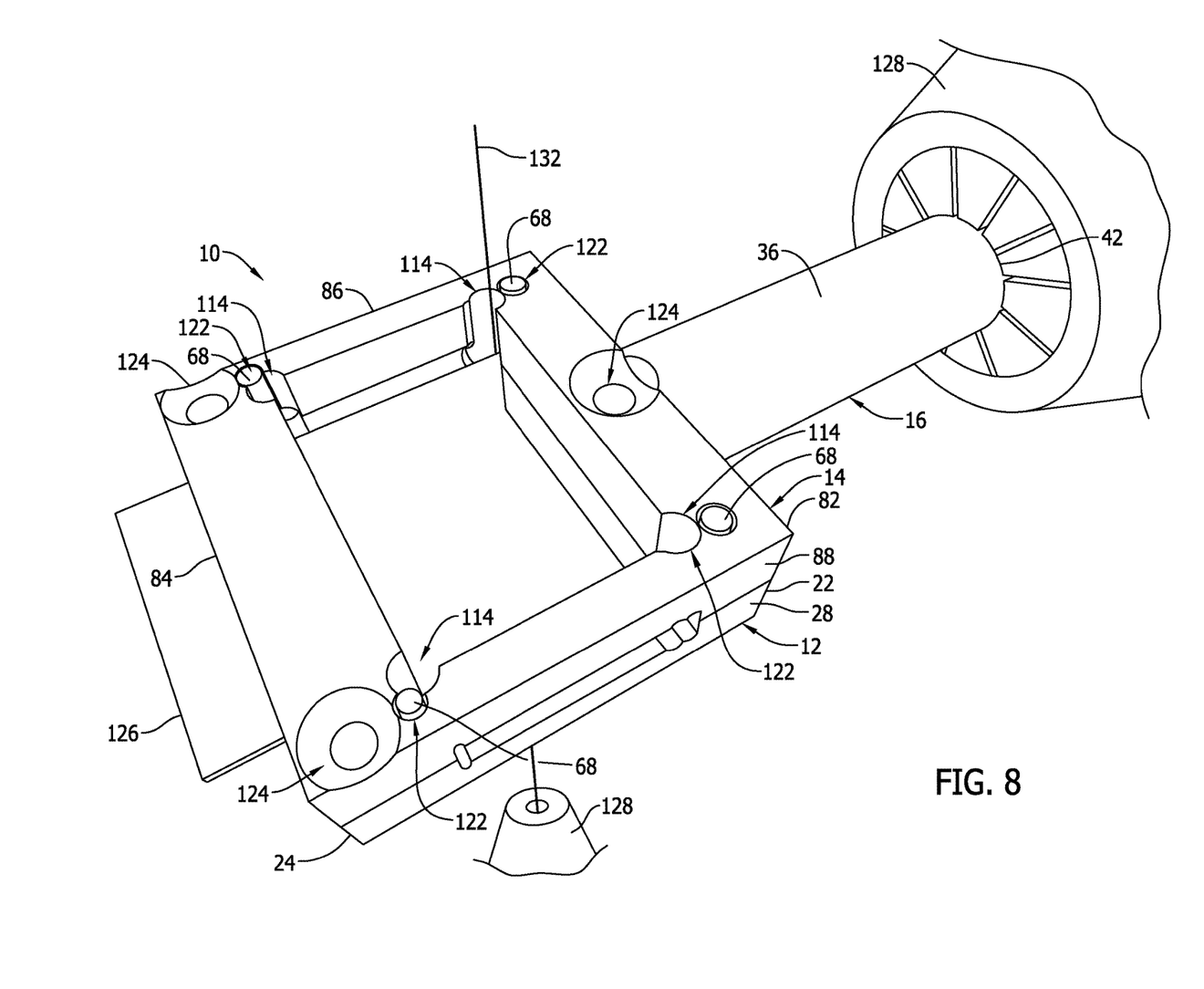
FIG. 8 is a representation of the fixture clamped on an EDM machine, with the fixture rotated 90° from the position of the fixture represented in FIG. 7, according to an example embodiment.

The wire 132 of the electrical discharge machine 128 is then cut and removed from the second groove 116.

If needed, a second, finishing cut can then be performed on the first face surface 134 of the specimen 126. The wire 132 of the electrical discharge machine 128 is again threaded through an aligned pair of the groove notches 66 on one side of the first groove 64 in the first block 12. The wire 132 of the electrical discharge machine 128 then makes a finishing cut across the first face surface 134 of the specimen 126 opposing the first groove 64 in the first block 12. The wire 132 of the electrical discharge machine 128 is then cut and removed from the first groove 64 in the first block 12.

The wire 132 of the electrical discharge machine 128 can then be threaded through a pair of aligned groove notches 118 at one side of the second groove 116 in the second block 14. The electrical discharge machine 128 is operated and the wire 132 of the electrical discharge machine 128 can then make a finishing cut on the second face surface 136 of the specimen 126 that opposes the second groove 116.

Additional finishing cuts could be made across the first face surface 134 of the specimen 126 and the second face surface 136 of the specimen 126 if needed.

Figure 9:
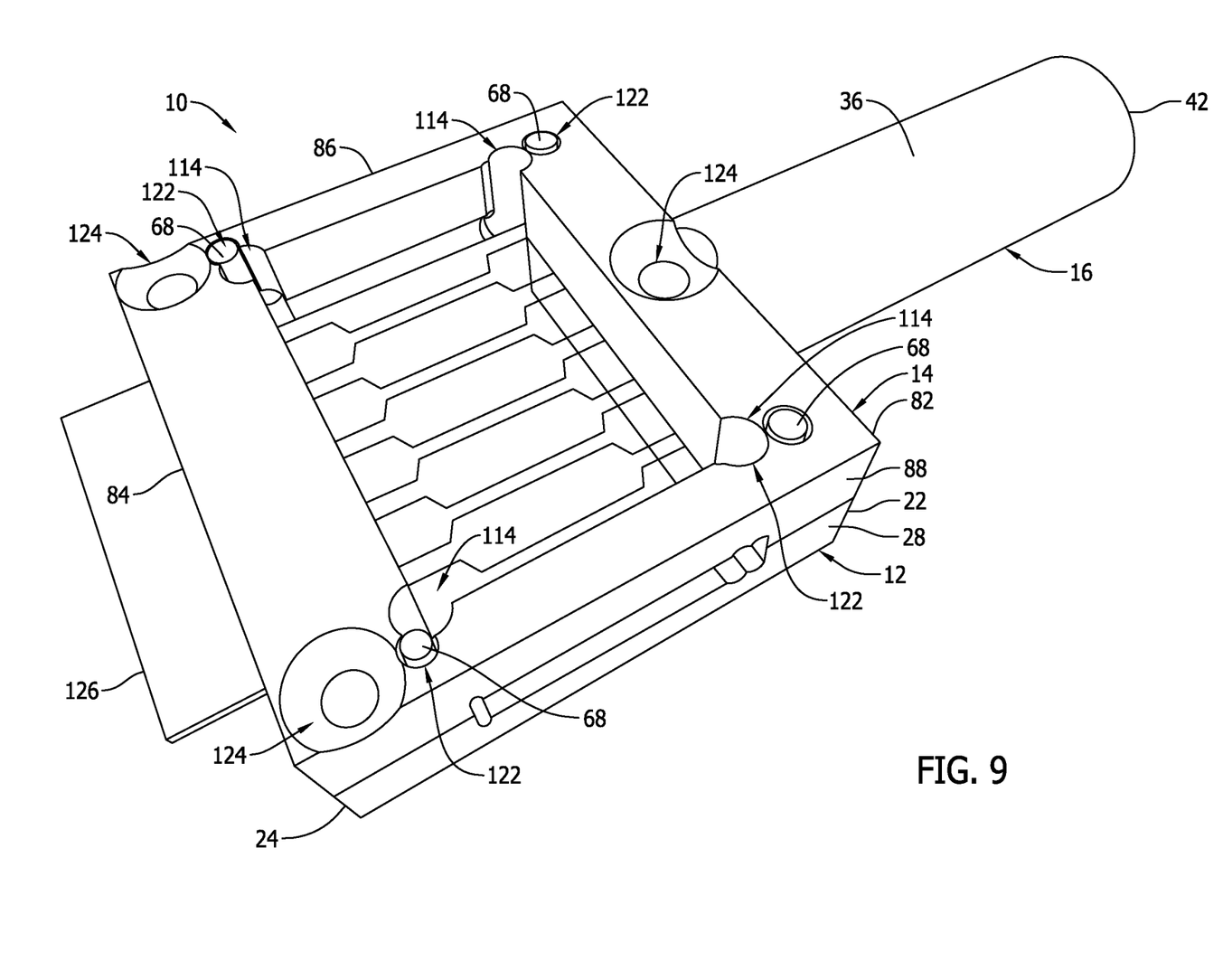
FIG. 9 is a representation of the fixture holding a specimen from which test samples have been cut, according to an example embodiment.

The fixture 10 can be rotated relative to the electrical discharge machine 128 so as to be in position for a profile cut of the specimen 126. In an example, with the wire 132 removed from the fixture 10, the fixture is then rotated about 90° relative to the electrical discharge machine 128. This is represented in FIG. 8. Within examples, the fixture 10 is rotated manually or by the electrical discharge machine 128. The wire 132 of the electrical discharge machine 128 is then threaded for a profile cut. In an example, the wire 132 is threaded through the hole 44 through the first block 12 and through the hole 96 of the second block 14. In another example, the wire 132 of the electrical discharge machine 128 is threaded through a hole notch 62 of the first block 12 that is aligned with a hole notch 114 of the second block 14. The electrical discharge machine 128 is then operated and the wire 132 is then used to make profile cuts to cut test samples, for example dog bone tensile test samples from the specimen 126. This is represented in FIGS. 8 and 9.

In the above manner, the fixture 10 holds opposite ends of the specimen 126 during an electrical discharge machining performed on the specimen 126 and prevents the test samples cut from the specimen 126 from bending or curving during the electrical discharge machining.

Figure 10:
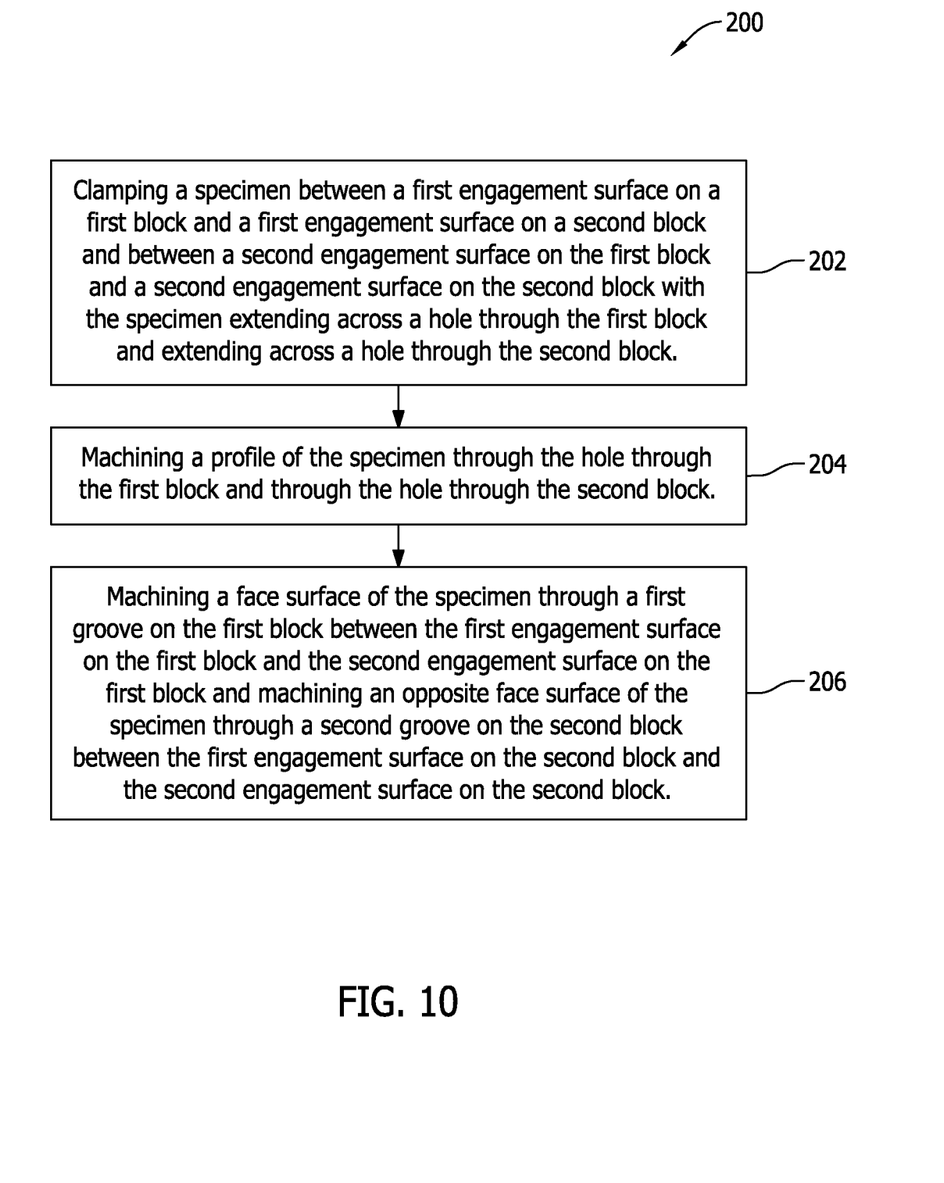
FIG. 10 is a flow chart of a method of machining a specimen, according to an example embodiment.

FIG. 10 is a flow chart of a method 200 of machining a specimen. Various embodiments of the method 200 may include additional steps not shown in FIG. 10, fewer steps than shown in FIG. 10, and/or different steps than shown in FIG. 10. The method is described with reference to the embodiments shown in FIGS. 1-9.

At block 202, the method 200 includes clamping a specimen between a first engagement surface on a first block and a first engagement surface on a second block and between a second engagement surface on the first block and a second engagement surface on the second block with the specimen extending across a hole through the first block and extending across a hole through the second block. At block 204, the method 200 includes machining a profile of the specimen through the hole through the first block and through the hole through the second block.

At block 206, the method includes machining a face surface of the specimen through a first groove on the first block between the first engagement surface on the first block and the second engagement surface on the first block and machining an opposite face surface of the specimen through a second groove on the second block between the first engagement surface on the second block and the second engagement surface on the second block.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

As various modifications could be made in the construction of the fixture that holds a specimen for electrical discharge machining of the specimen and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A fixture that holds a specimen for machining of the specimen, the fixture comprising:
 a first frame-shaped block surrounding a perimeter of a first through-hole through the first frame-shaped block for a profile cut of the specimen and a first groove on the first frame-shaped block for a face cut of the specimen, the first through-hole being positioned between and separating a first specimen engagement surface on the first frame-shaped block and a second specimen engagement surface on the first frame-shaped block;

a second frame-shaped block surrounding a perimeter of a second through-hole through the second frame-shaped block for a profile cut of the specimen and a second groove on the second frame-shaped block for a face cut of the specimen, the second through-hole positioned between and separating a first specimen engagement surface on the second frame-shaped block and a second specimen engagement surface on the second frame-shaped block;

the first frame-shaped block and the second frame-shaped block being attachable together to clamp a specimen between the first specimen engagement surface on the first frame-shaped block and the first specimen engagement surface on the second frame-shaped block and between the second specimen engagement surface on the first frame-shaped block and the second specimen engagement surface on the second frame-shaped block, such that the specimen is accessible for machining through the first through-hole through the first frame-shaped block and through the second through-hole through the second frame-shaped block.

2. The fixture of claim 1, further comprising:
a shaft extending from an exterior side wall of the first frame-shaped block opposite a surface defining the first through-hole, the shaft being configured for attachment to a device that is operable to machine the specimen.

3. The fixture of claim 2, further comprising:
the device being an electrical discharge machine and an axis of rotation of the shaft is transverse to a longitudinal axis of the first through-hole.

4. The fixture of claim 1, wherein the first through-hole through the first frame-shaped block, the first specimen engagement surface on the first frame-shaped block and the second specimen engagement surface on the first frame-shaped block are configured to mirror the second through-hole through the second frame-shaped block, the first specimen engagement surface on the second frame-shaped block and the second specimen engagement surface on the second frame-shaped block.

5. The fixture of claim 1, wherein:
the first specimen engagement surface on the first frame-shaped block and the second specimen engagement surface on the first frame-shaped block are coplanar; and,
the first specimen engagement surface on the second frame-shaped block and the second specimen engagement surface on the second frame-shaped block are coplanar.

6. The fixture of claim 1, further comprising:
the first groove extending across the first through-hole through the first frame-shaped block, the first groove having a length dimension that is equal to a width dimension of the first through-hole through the first frame-shaped block;
the second groove extending across the second through-hole through the second frame-shaped block, the second groove having a length dimension that is equal to a width dimension of the second through-hole through the second frame-shaped block; and,
wherein the specimen is accessible for machining through the first groove on the first frame-shaped block and through the second groove on the second frame-shaped block.

7. The fixture of claim 1, further comprising:
the first through-hole through the first frame-shaped block having a first width dimension;
the second through-hole through the second frame-shaped block having a second width dimension; and,
the first width dimension and the second width dimension being larger than a width dimension of the specimen.

8. The fixture of claim 1, further comprising:
the first frame-shaped block and the second frame-shaped block being attachable together by a plurality of fasteners.

9. The fixture of claim 1, further comprising:
a dowel pin projecting from one of the first frame-shaped block and the second frame-shaped block; and,
a dowel pin hole extending into one of the first frame-shaped block and the second frame-shaped block, the dowel pin being receivable in the dowel pin hole and aligning the first frame-shaped block and the second frame-shaped block.

10. The fixture of claim 1, further comprising:
hole notches that pass through the first frame-shaped block and are dimensioned to receive a wire of an electrical discharge machine through the hole notches that pass through the first frame-shaped block; and,
hole notches that pass through the second frame-shaped block and are dimensioned to receive a wire of an electrical discharge machine through the hole notches that pass through the second frame-shaped block.

11. The fixture of claim 10, further comprising:
groove notches that pass through the first frame-shaped block and are dimensioned to receive a wire of an electrical discharge machine through the groove notches that pass through the first frame-shaped block; and,
groove notches that pass through the second frame-shaped block and are dimensioned to receive a wire of an electrical discharge machine through the groove notches that pass through the second frame-shaped block.

12. A fixture that holds a specimen when machining the specimen, the fixture comprising:
a first frame-shaped block;
a first through-hole through the first frame-shaped block with the first frame-shaped block surrounding a perimeter of the first through-hole, the first through-hole being positioned between and separating a first specimen engagement surface on the first frame-shaped block and a second specimen engagement surface on the first frame-shaped block;
a second frame-shaped block;
a second through-hole through the second frame-shaped block with the second frame-shaped block surrounding a perimeter of the second through-hole, the second through-hole positioned between and separating a first specimen engagement surface on the second frame-shaped block and a second specimen engagement surface on the second frame-shaped block;
a shaft extending from the first frame-shaped block;
the first frame-shaped block and the second frame-shaped block being attachable together to clamp a specimen between the first specimen engagement surface on the first frame-shaped block and the first specimen engagement surface on the second frame-shaped block and between the second specimen engagement surface on the first frame-shaped block and the second specimen engagement surface on the second frame-shaped block with the specimen being accessible for machining through the first through-hole through the first frame-shaped block and through the second through-hole through the second frame-shaped block; and the shaft being configured for attachment to a device that is operable to machine the specimen clamped between the first specimen engagement surface on the first frame-shaped block and the first specimen engagement surface on the second frame-shaped block and between the second specimen engagement surface on the first frame-shaped block and the second specimen engagement surface on the second frame-shaped block.

13. The fixture of claim 12, further comprising:
a first groove extending across the first frame-shaped block and across the first through-hole through the first frame-shaped block;
a second groove extending across the second frame-shaped block and across the second through-hole through the second frame-shaped block;
at least one hole notch that passes through the first frame-shaped block and intersects the first through-hole through the first frame-shaped block, the at least one hole notch that passes through the first frame-shaped block being dimensioned to receive a wire of an electrical discharge machine through the at least one hole notch that passes through the first frame-shaped block;
at least one hole notch that passes through the second frame-shaped block and intersects the second through-hole through the second frame-shaped block, the at least one hole notch that passes through the second frame-shaped block being dimensioned to receive a wire of an electrical discharge machine through the at least one hole notch that passes through the second frame-shaped block;
at least one groove notch that passes through the first frame-shaped block at a side of the first groove extending across the first frame-shaped block, the at least one groove notch that passes through the first frame-shaped block being dimensioned to receive a wire of an electrical discharge machine through the at least one groove notch that passes through the first frame-shaped block; and
at least one groove notch that passes through the second frame-shaped block at a side of the second groove extending across the second frame-shaped block, the at least one groove notch that passes through the second frame-shaped block being dimensioned to receive a wire of an electrical discharge machine through the at least one groove notch that passes through the second frame-shaped block.

14. The fixture of claim 12, further comprising:
the device being an electrical discharge machine.

15. The fixture of claim 12, further comprising:
the first specimen engagement surface on the first frame-shaped block and the second specimen engagement surface on the first frame-shaped block are coplanar; and,
the first specimen engagement surface on the second frame-shaped block and the second specimen engagement surface on the second frame-shaped block are coplanar.

16. The fixture of claim 15, further comprising:
the first through-hole through the first frame-shaped block having a first width dimension;
the second through-hole through the second frame-shaped block having a second width dimension; and,
the first width dimension and the second width dimension being larger than a width dimension of the specimen.

17. The fixture of claim 12, further comprising:
the first frame-shaped block and the second frame-shaped block being releasably attachable together by a plurality of fasteners.

18. The fixture of claim 12, further comprising:
a plurality of dowel pins projecting from the first specimen engagement surface on the first frame-shaped block and the second specimen engagement surface on the first frame-shaped block;
a plurality of dowel pin holes in the first specimen engagement surface of the second frame-shaped block and in the second specimen engagement surface of the second frame-shaped block, and,
the plurality of dowel pins being receivable in the plurality of dowel pin holes and aligning the first frame-shaped block and the second frame-shaped block.

19. A method of machining a specimen, the method comprising:
clamping a specimen between a first specimen engagement surface on a first frame-shaped block and a first specimen engagement surface on a second frame-shaped block and between a second specimen engagement surface on the first frame-shaped block and a second specimen engagement surface on the second frame-shaped block with the specimen extending across a first through-hole through the first frame-shaped block with the first frame-shaped block surrounding a perimeter of the first through-hole and extending across a second through-hole through the second frame-shaped block with the second frame-shaped block surrounding a perimeter of the second through-hole;
machining a profile of the specimen through the first through-hole through the first frame-shaped block and through the second through-hole through the second frame-shaped block; and,
machining a face surface of the specimen through a first groove on the first frame-shaped block between the first specimen engagement surface on the first frame-shaped block and the second specimen engagement surface on the first frame-shaped block and machining an opposite face surface of the specimen through a second groove on the second frame-shaped block between the first specimen engagement surface on the second frame-shaped block and the second specimen engagement surface on the second frame-shaped block.

20. The method of claim 19, further comprising the first frame-shaped block and the second frame-shaped block being releasably attachable together by a plurality of fasteners.

* * * * *

UNITED STATES PATENT AND TRADEMARK OFFICE
CERTIFICATE OF CORRECTION

PATENT NO. : 12,194,557 B2
APPLICATION NO. : 16/517068
DATED : January 14, 2025
INVENTOR(S) : Stefanie Anita Meier and Don Browder Page 1 of 1

It is certified that error appears in the above-identified patent and that said Letters Patent is hereby corrected as shown below:

In the Claims

Column 9, Line 5, Claim 1, correct "through-bole through" to read -- through-hole through --

Signed and Sealed this
Twenty-fifth Day of February, 2025

Coke Morgan Stewart
*Acting Director of the United States Patent and Trademark Office*